United States Patent
Grunnet et al.

(10) Patent No.: US 11,002,250 B2
(45) Date of Patent: May 11, 2021

(54) CONTROLLING BEARING WEAR

(71) Applicant: VESTAS WIND SYSTEMS A/S, Aarhus (DK)

(72) Inventors: Jacob Deleuran Grunnet, Tranbjerg (DK); Damien Castaignet, Nantes (FR); Keld Hammerum, Hadsten (DK); Kasper Zinck, Fleming (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 338 days.

(21) Appl. No.: 16/076,564

(22) PCT Filed: Feb. 10, 2017

(86) PCT No.: PCT/DK2017/050035
§ 371 (c)(1),
(2) Date: Aug. 8, 2018

(87) PCT Pub. No.: WO2017/137050
PCT Pub. Date: Aug. 17, 2017

(65) Prior Publication Data
US 2019/0048849 A1     Feb. 14, 2019

(30) Foreign Application Priority Data

Feb. 12, 2016  (DK) .............................. PA201670076

(51) Int. Cl.
*F03D 7/02*  (2006.01)
*F03D 80/70*  (2016.01)
(Continued)

(52) U.S. Cl.
CPC .........  *F03D 7/0292* (2013.01); *F03D 7/0224* (2013.01); *F03D 7/042* (2013.01);
(Continued)

(58) Field of Classification Search
CPC ........ F03D 7/0292; F03D 7/042; F03D 80/70; F03D 17/00; F03D 7/0224; Y02E 10/72
See application file for complete search history.

(56) References Cited

U.S. PATENT DOCUMENTS 7,677,075 B2 *    3/2010   Nies ....................... G01K 15/00
                                                         73/1.01
2008/0078228 A1 *  4/2008   Nies ....................... G01W 1/18
                                                         73/1.01
(Continued)

FOREIGN PATENT DOCUMENTS

CN       202326730 U    7/2012
CN       102635513 A    8/2012
(Continued)

OTHER PUBLICATIONS

Chinese Office Action for Application No. 201780010798.X dated May 24, 2019.
(Continued)

*Primary Examiner* — Ninh H. Nguyen
*Assistant Examiner* — Brian Christopher Delrue
(74) *Attorney, Agent, or Firm* — Patterson + Sheridan, LLP

(57) ABSTRACT

A method of controlling a wind turbine is described. The method comprises calculating a current wear rate for each of the main bearing of a turbine rotor and the blade bearings of rotor blades mounted on the turbine rotor, and calculating a blade pitch adjustment of the rotor blades to achieved a desired ratio between main bearing wear and blade bearing wear in dependence on the calculated current wear rates of the main bearing and the blade bearings.

23 Claims, 4 Drawing Sheets

(51) Int. Cl.
*F03D 17/00* (2016.01)
*F03D 7/04* (2006.01)

(52) U.S. Cl.
CPC ............ *F03D 17/00* (2016.05); *F03D 80/70* (2016.05); *F05B 2240/50* (2013.01); *F05B 2260/79* (2013.01); *Y02E 10/72* (2013.01)

(56) References Cited

U.S. PATENT DOCUMENTS

| | | | |
|---|---|---|---|
| 2010/0014971 A1 | 1/2010 | Risager et al. | |
| 2011/0142621 A1* | 6/2011 | D .............................. | F03D 17/00 416/1 |
| 2014/0248123 A1* | 9/2014 | Turner .................... | F03D 7/043 415/1 |
| 2014/0284926 A1 | 9/2014 | Tirumalai et al. | |
| 2015/0003983 A1* | 1/2015 | Coultate ................ | F03D 7/043 416/1 |
| 2020/0160195 A1* | 5/2020 | Strharsky ............... | G01N 35/00 |

FOREIGN PATENT DOCUMENTS

| | | | | |
|---|---|---|---|---|
| EP | 3015705 A1 | 5/2016 | | |
| WO | 2007/104306 A1 | 9/2007 | | |
| WO | 2015/051801 A1 | 4/2015 | | |
| WO | WO-2015051801 A1 * | 4/2015 | ............. | F03D 17/00 |
| WO | 2015/086024 A1 | 6/2015 | | |
| WO | WO-2015086024 A1 * | 6/2015 | ............... | F03D 9/25 |
| WO | 2017137050 A1 | 8/2017 | | |

OTHER PUBLICATIONS

PCT Written Opinion of the International Searching Authority for Application No. PCT/DK2017/050035 dated Dec. 2, 2016.

PCT International Search Report for Application No. PCT/DK2017/050035 dated May 16, 2017.

Danish Patent and Trademark Office 1st Technical Examiination for Applicaton No. PA 2016 70076 dated Aug. 30, 2016.

* cited by examiner

CONTROLLING BEARING WEAR

FIELD OF THE INVENTION

The present invention relates to controlling bearing wear. More particularly, the invention relates to a method of controlling a wind turbine, and a wind turbine, in which blade pitch is controlled to balance the wear on a main bearing and the blade bearings of a turbine rotor.

BACKGROUND TO THE INVENTION

Wind turbines comprise a fixed tower which stands on the ground or sea bed, and a nacelle which rests on the top of the tower and carries a turbine shaft, a gearbox, a brake, a generator, a blade pitch controller which controls the angle of the turbine blades, and a yaw drive which controls the position of the wind turbine relative to the wind. Turbine blades are mounted to the turbine shaft externally of the nacelle. The turbine blades cause the shaft to rotate under the influence of wind, which in turn drives the generator to generate electrical power. The pitch of the blades is controlled by the blade pitch controller. The pitch of the blade is adjusted by rotating each blade around its axis in order to change its angle of attack to the wind. Changing the pitch of the blade is a useful technique for limiting peak power, optimizing rotor efficiency, and slowing down the rotor. Traditional pitch control methods utilise collective pitch control, in which the pitch of all blades is adjusted simultaneously. More advanced methods of pitch control include cyclic pitch control and individual pitch control. Cyclic pitch control varies the blade pitch angles with a phase shift of 120° (in the case of 3 turbine blades) to reduce the load variations caused by rotor tilt and yaw errors. Individual pitch control adjusts the pitch angle of each blade independently. In practice, both techniques can be used on a single set of turbine blades, that is a collective pitch component may be used to, for example keep the power at a desired level, while an individual pitch component may be used to help minimise loading on the turbine components without reducing the power output.

One of the design drivers for turbines utilising individual pitch control is the trade-off between blade bearing and main bearing loading and wear. In order to reduce main bearing loading the amount of allowed pitch activity can be increased, but this comes at the cost of increased blade bearing wear, in some cases resulting in the need for early blade bearing replacement. This problem has been addressed previously, but a satisfying solution has not yet been found. Examples are the Load Dependent Deactivation Strategies developed for TYC/ETYC (Tilt and Yaw Control/Enhanced Tilt and Yaw Control), described in WO2013/182204, and the Rotor Load Control 3.0 activation strategies, described in WO2015/051801. Both techniques significantly improve the balancing of blade bearing wear versus main bearing/shaft load reductions but neither technique adequately addresses the trade-off between aerodynamically lifting the rotor to compensate for the gravity loading of the main bearing and the resulting increase in pitch activity.

Current TYC activation strategies are mostly sensitive to wind shear and turbulence, with the result that the amount of main bearing load reduction achieved from rotor lift is dependent on the turbulence level on the site, while it is the mean loading and number of operating hours which determine the bearing wear. This also means that the wear of the main bearing is highly dependent on the wind speed distribution for a given wind farm. Consequently some sites will experience higher than intended blade or main bearing wear depending on the wind speed and shear distribution which can results in the need for early replacement of bearings or that turbines cannot be used on certain sites.

It is against this background that the invention has been devised.

SUMMARY OF THE INVENTION

In a first aspect, the invention provides a method of controlling a wind turbine, comprising:
calculating a current wear rate for each of the main bearing of a turbine rotor and the blade bearings of rotor blades mounted on the turbine rotor; and
calculating a blade pitch adjustment of the rotor blades to achieve a desired ratio between main bearing wear and blade bearing wear in dependence on the calculated current wear rates of the main bearing and the blade bearings.

Preferably, the calculation of the blade pitch adjustment is dependent on an influence of blade pitch on each of main bearing wear and blade bearing wear.

Preferably, the method comprises calculating a current wear ratio between wear on the main bearing and wear on the blade bearings in dependence on the calculated current wear rate of each of the main bearing and the blade bearings, a lifetime design wear capacity of the main bearing and a lifetime design wear capacity of the blade bearings, and calculating an adjustment of the blade pitch which will shift the current wear ratio to match the desired wear ratio.

Preferably, the current wear rate of the main bearing is calculated in dependence on a current load on the main bearing. This may be achieved by measuring a load on the main bearing, wherein the current load on the main bearing is based on the measured load on the main bearing. The current wear rate of the main bearing may be calculated in dependence on current rotor speed.

Preferably, the method comprises calculating an influence of current blade pitch on the load on the main bearing. The influence of current blade pitch on the load on the main bearing may be dependent on a blade flap load sensitivity to pitching obtained from a computerised model. The method may comprise calculating a raw main bearing load without blade pitch influence using the calculated influence of current blade pitch. The method may further comprise calculating, in relation to a candidate blade pitch, an estimated main bearing load using that candidate blade pitch. The method may further comprise estimating an influence of the candidate blade pitch on the load on the main bearing, and estimating the main bearing load based on the raw main bearing load and the estimated influence of the candidate blade pitch.

Preferably, the current wear rate of the blade bearings is calculated in dependence on a current load on the main bearing. This may be achieved by measuring a load on the blade bearings, wherein the current load on the blade bearings is based on the measured load on the blade bearings. The current load on the blade bearings may be obtained based on a computerised model. The current wear rate of the blade bearings may be calculated in dependence on current rotor speed.

Preferably, the blade pitch adjustment is a modification to a cyclic pitch amplitude of the rotor blades.

In one implementation, the method may comprise setting a desired wear ratio in dependence on one or both of an amount of shear and an amount of turbulence expected at the location of the wind turbine. The desired wear ratio may be set such that the main bearing and the blade bearings will require replacement at approximately the same time. Alternatively, the desired wear ratio may be set such that one of the main bearing and the blade bearings will require replacement after a duration which is a multiple of the other of the main bearing and the blade bearings.

In another implementation, the method may comprise accumulating the current wear rates over time, and automatically extrapolating a lifetime for the main bearing and/or the blade bearings. Such a method may further comprise adjusting the desired wear ratio to reduce the likelihood of overloading one of the bearings or permitting simultaneous replacement of the main bearing and blade bearings or increasing the total lifetime of the turbine without replacing the bearings.

In a second aspect, the invention provides a wind turbine having a turbine rotor mounted on a main bearing and a set of rotor blades mounted on the turbine rotor using blade bearings, the wind turbine comprising a controller operable:
 to calculate a current wear rate for each of the main bearing and the blade bearings; and
 to calculate a blade pitch adjustment of the rotor blades to achieve a desired ratio between main bearing wear and blade bearing wear in dependence on the calculated current wear rates of the main bearing and the blade bearings.

In a third aspect, the invention provides a computer program product carrying a computer program which when executed on a data processing apparatus will cause the data processing apparatus to control a wind turbine in accordance with the above methods.

DETAILED DESCRIPTION OF EMBODIMENTS OF THE INVENTION

Figure 1:
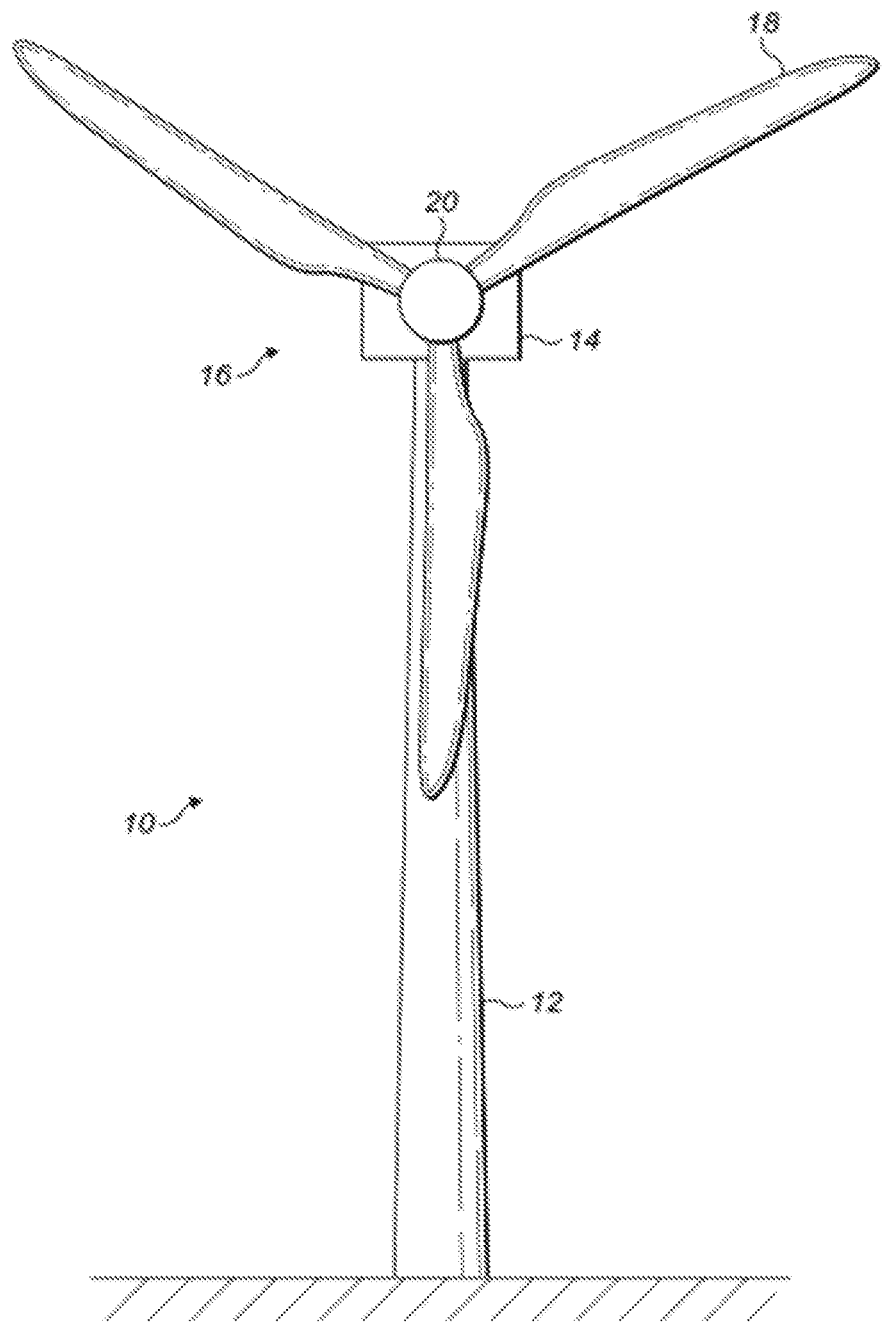
FIG. 1 is a schematic view of a wind turbine system.

FIG. 1 shows a wind turbine 10 comprising a tower 12 supporting a nacelle 14 to which a rotor 16 is mounted. The rotor 16 comprises a plurality of wind turbine blades 18 that extend radially from a central hub 20. In this example, the rotor 16 comprises three blades 18. As discussed above, the pitch (angle of attack with respect to the wind) of the wind turbine blades 18 can be adjusted by a blade pitch controller (not shown), while the yaw of the nacelle 14 can be adjusted by a yaw drive (not shown) to face generally into the wind. The rotor 16 is mounted on a main bearing (not shown), which permits the rotor to rotate freely about its axis. The wind turbine blades 18 are each mounted to the rotor via blade bearings (not shown), which permit the blade 18 to rotate about their longitudinal axis to adjust their pitch.

Figure 2:
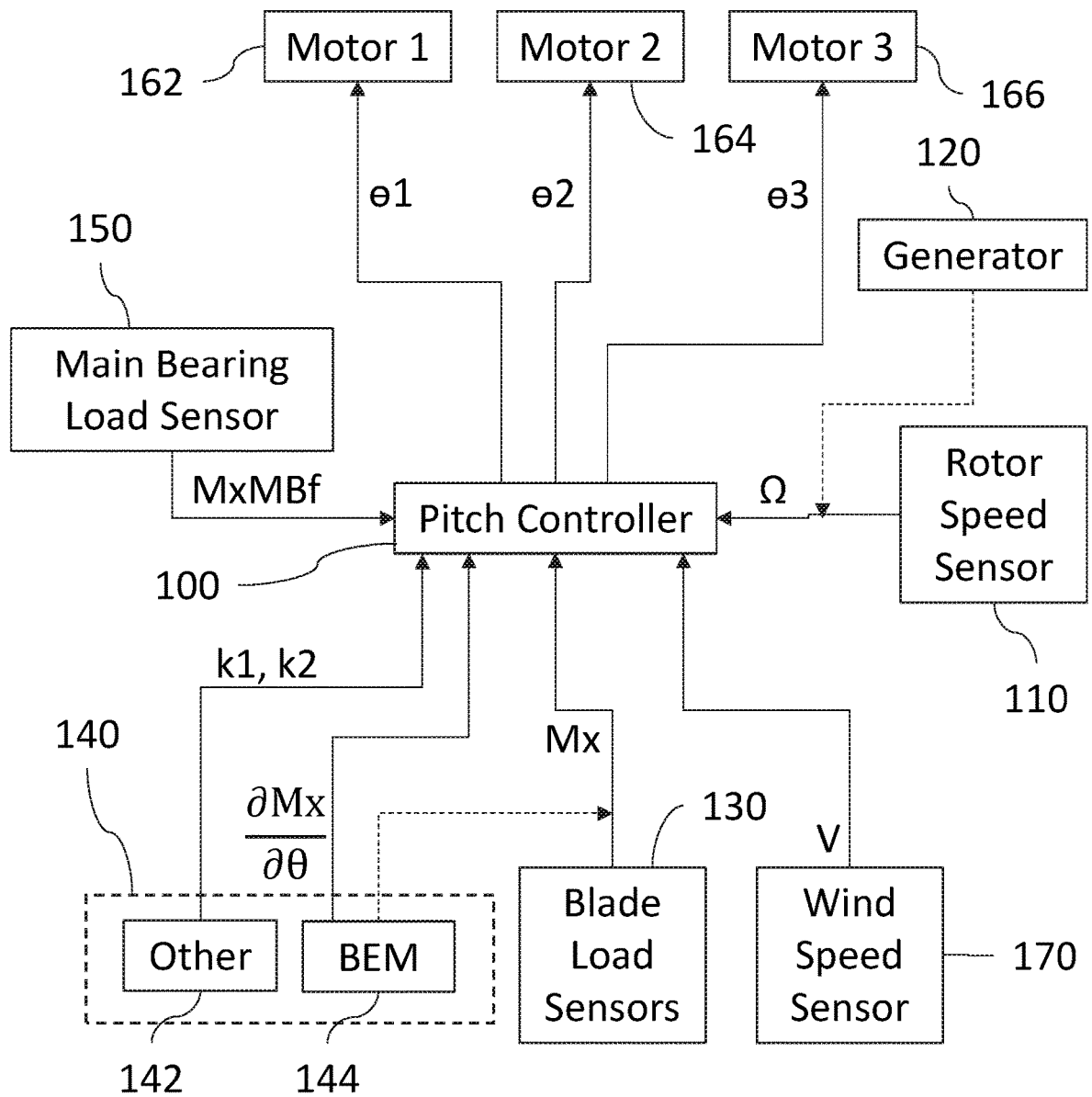
FIG. 2 is a schematic functional diagram of a pitch controller and associated sensors.

FIG. 2 shows a blade pitch controller 100 which is operable to control the blade pitch of the (in this case) three turbine blades. In particular, the pitch controller 100 is operable to generate three separate pitch control signals, one for each blade. The pitch of each blade is set by a pitch control actuator in response to a pitch control signal from the blade pitch controller 100. In particular, the pitch of a first turbine blade is set by a pitch control actuator 162 in response to a first pitch control signal $\theta_1$, the pitch of a second turbine blade is set by a pitch control actuator 164 in response to a second pitch control signal $\theta_2$ and the pitch of a third turbine blade is set by a pitch control actuator 166 in response to a third pitch control signal $\theta_3$. The pitch of the rotor blade set (and of the blades individually) may be influenced by several algorithms, of which the present technique is only one. Other algorithms may be used to control rotor speed, or to reduce the impact of turbulence. It will be appreciated therefore that the present technique can be considered to influence the pitch of the rotor blades rather than define it entirely. In some embodiments, the present technique adjusts the maximum amplitude $|\theta|$ of sinusoidal individual pitch contribution computed by a Tilt/Yaw (cyclic pitch control) algorithm, which will in turn influence the individual control signals $\theta_1$, $\theta_2$, $\theta_3$. The actual pitch angle of blade i (I=1, 2, 3) is related through:

$$\theta_i = \theta + |\theta|\sin(\psi + \psi_i) \qquad (1)$$

Where $\theta$ is the collective pitch angle (applied to all rotor blades 18 in the set) and $|\theta|\sin(\psi+\psi_i)$ is the individual pitch angle of each blade with respect to its rotational position, in which $\psi$ is the rotor azimuth angle, $\psi_i$ is the phase shift (0, 120 or 240) for blades A, B and C respectively, and $|\theta|$ is the maximum amplitude of the individual pitch contribution—which is achieved when the sine function takes on a value of one.

FIG. 2 indicates the origin of various parameters which the present technique uses in order to calculate a desired blade pitch adjustment. In particular, the pitch controller 100 receives a current rotor speed $\Omega$, measured in Hz, from either a speed sensor 110 coupled to the rotor, or from a generator 120 to which the rotor is attached. The pitch controller 100 also receives a blade flap moment Mx, in NewtonMeters either from blade load sensors 130 mounted to the turbine, or from a blade element momentum (BEM) model 144 in a data store 140. The pitch controller 100 also receives, from the blade element momentum model 144, a blade flap load sensitivity to pitching $$\frac{\partial Mx}{\partial \theta}$$

indicative of the influence or pitch on blade load at the current operating point of the turbine. The pitch controller 100 also receives, from further data 142 stored in the data store 140, Wöhler coefficients k1, k2 (dimensionless) derived from the material properties of the main bearing and the blade bearings respectively. The pitch controller 100 also receives, from a main bearing load sensor 150, a main bearing tilt load $Mx_{MBf}$, again in NewtonMeters. The pitch controller 100 also receives, from a wind speed sensor 170, a current wind speed V, in m/s, at the turbine.

The present technique can be implemented using a blade element momentum (BEM) model to compute aerodynamic sensitivities to blade pitch, rotor speed and wind speed. The on-line BEM model can describe blade load calculations based on lift and drag coefficient (cL, cD) curves for the blades and a wind estimator which computes the rotor plane wind speed based on a difference between the predicted rotor power and the actual produced power.

Based on the computed operating point (that is, a current blade pitch, wind speed and rotor speed combination), the sensitivities can be found by for example a 0th order estimate. For example, the blade flap load sensitivity to pitching can be found as:

$$\frac{\partial Mx}{\partial \theta} \approx \frac{M_x(\Delta\theta + \theta_0, V_0, \Omega_0) - M_x(\theta_0 - \Delta\theta, V_0, \Omega_0)}{\Delta\theta} \quad (2)$$

Where $\theta_0$, $V_0$, $\Omega_0$ is the computed operating point $\Delta V$, $\Delta\theta$ are the wind speed and pitch ranges over which the 0th order approximation is done and $M_x$ is the estimated blade root in plane moment.

Figure 3:
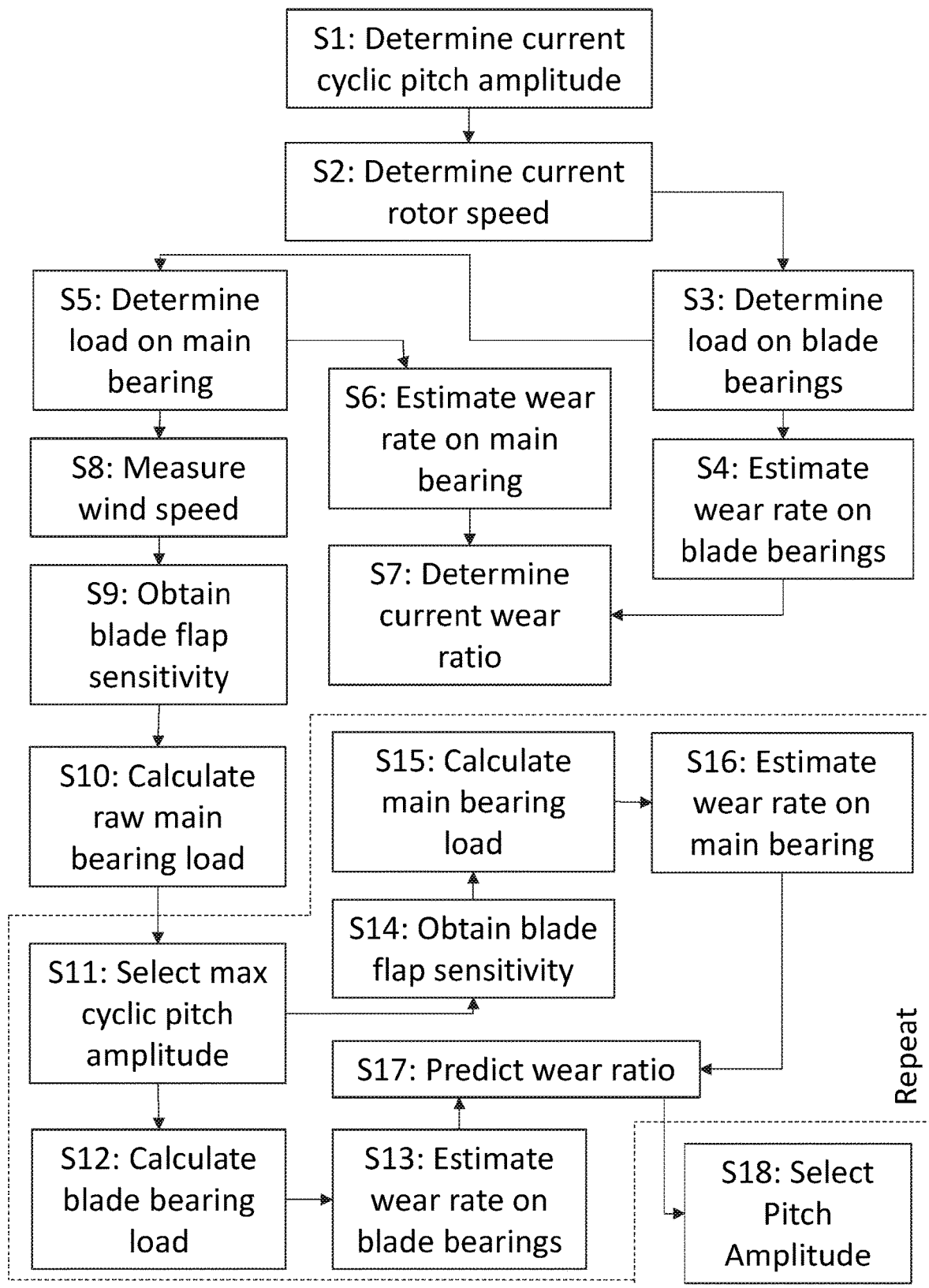
FIG. 3 is a schematic flow diagram of a method of balancing wear between a main bearing and blade bearings.

Referring to FIG. 3, a process is shown by which the above parameters are used to adjust the blade pitch to balance wear between the main bearing and the blade bearings. At a step S1, a current cyclic pitch amplitude θ|θact is determined. Since this is the value currently being used by the pitch controller 100 in setting the pitch control signals θ1, θ2, θ3, this parameter is readily obtained. At a step S2, the current rotor speed Ω is obtained, as indicated above either from the sensor 110 or the generator 120. At a step S3, the current load on the blade bearings is determined. This could either be measured directly using the sensors 130, or estimated from a computerised model, in the form of the blade element momentum model 144. The current (actual) wear rate on the blade bearings is then estimated at a step S4 based on the current (actual) cyclic pitch amplitude |θ|act, the current rotor speed Ω, the current load Mx on the blade bearings and the Wöhler coefficient k2. In other words, the parameters collected at the steps S1, S2 and S3 are used in the estimate of current blade bearing wear made at the step S4. An estimate of the wear rate of the pitch bearing can be made on the basis of the following expression:

$$\frac{dLRD_{PB}}{dt} \approx \left(\frac{2|\theta|act\ \Omega}{360} Mx\right)^{k2} \quad (3)$$

Where the subexpression $$\frac{2|\theta|\Omega}{360}$$

is the pitch travel speed depending on the cyclic pitch amplitude. The pitch travel distance per rotor rotation is 2|θ|/360 and Ω is the number of rotor rotations per second. The wear rate of the pitch bearing is therefore the pitch travel distance multiplied by the measured blade root flap load $M_x$ to the power k2, which as mentioned above is the Wöhler coefficient derived from the material properties of the pitch bearing.

At a step S5, the load on the main bearing $Mx_{Mbf}$ is measured by the main bearing load sensor 150. Then, at a step S6, the current wear rate on the main bearing is estimated based on the current rotor speed Ω, the measured load on the main bearing $Mx_{Mbf}$ and the Wöhler coefficient k1. In other words, the parameters collected at the steps S2 and S5 are used in the estimate of current main bearing wear made at the step S6.

An estimate of the wear rate on the main bearing can be made on the basis of the following expression:

$$\frac{dLRD_{MB}}{dt} \approx (2\Omega Mx_{Mbf})^{k1} \quad (4)$$

Where Ω is the measured rotor speed in Hz, $M_{x_{Mbf}}$ is the quantity measured as explained above and k1 is the Wöhler coefficient derived from the material properties of the main bearing.

At a step S7, the estimates for main bearing wear rate and blade bearing wear rate, and lifetime design wear capacities for the main bearing ($LRD_{PB,design}$) and the blade bearings ($LRD_{MB,design}$), are used to calculate a wear ratio between the main bearing and the blade bearings.

A lifetime reduction rate $PB_r$ of the blade bearing can be found as follows:

$$\frac{\frac{dLRD_{PB}}{dt}}{LRD_{PB,design}} = PB_r \quad (5)$$

Similarly, a lifetime reduction rate $MB_r$ of the main bearing can be found as follows:

$$\frac{\frac{dLRD_{MB}}{dt}}{LRD_{MB,design}} = MB_r \quad (6)$$

The ratio between the lifetime reduction rates $PB_r$, $MB_r$ of the two types of bearings then determines the relative wear rate of the bearings weighted by their lifetime design wear capacity.

$$\frac{MB_r}{PB_r} = \frac{\frac{dLRD_{MB}}{dt}}{\frac{dLRD_{PB}}{dt}} \frac{LRD_{PB,design}}{LRD_{MB,design}} = R \quad (7)$$

This yields a ratio R, which can be adjusted to control which bearing type experiences most wear. This (current) wear ratio, obtained via the steps S1 to S7, is an indication of the current balance between wear on the main bearing and wear on the blade bearings. It will be appreciated that, in order that the blade bearings and main bearing experience the same amount of wear (as a proportion of their respective lifetime wear capacities), the wear ratio can be expected to be 1. In order that the main bearing experiences twice as much wear as the blade bearings (again as a proportion of their respective lifetime wear capacities), the wear ratio can be expected to be 2. In order that the blade bearings experience twice as much wear as the main bearing (again as a proportion of their respective lifetime wear capacities), the wear ratio can be expected to be 0.5. It will be understood that equation (7) determines an instantaneous wear ratio, rather than a lifetime wear ratio. However, the instantaneous wear ratio can be adjusted based on historic relative wear to balance out higher than expected wear on the main bearing or the blade bearings in the past.

The remaining steps of FIG. 3 relate to the selection of a suitable pitch adjustment to achieve a desired wear ratio (in contrast to the actual wear ratio obtained at the step S7). At a step S8, the current wind speed V is measured by the wind speed sensor 170. At a step S9, the blade flap load sensitivity to pitching $$\frac{\partial Mx}{\partial \theta}$$

is obtained from the blade element model 144. This derived parameter is modelled as a function of wind speed V, blade pitch θ, rotor speed Ω and blade root in plane moment Mx, that is, the parameters obtained at the steps S1, S2, S3 and S8, which are used as inputs to the blade element model 144 to look up the corresponding blade flap load sensitivity to pitching $$\frac{\partial Mx}{\partial \theta}.$$

It should be noted that the step S9 need not necessarily be performed based on measured wind speed, but may instead be obtained using a Blade Element Model estimator, which has a rotor plane wind speed estimate embedded. At a step S10, a raw main bearing load $Mx_{Mbf}$ raw is calculated based on the measured main bearing load $Mx_{Mbf}$, the blade flap load sensitivity to pitching $$\frac{\partial Mx}{\partial \theta},$$

and the current (actual) cyclic pitch amplitude |θ|act.

The raw main bearing load $M_{x_{MBfraw}}$ is defined as the measured main bearing load (either directly on the main shaft/bearing or from load sensors in the blade) in addition to the estimated load reduction performed by the Tilt-Yaw control.

$$Mx_{Mbf,raw} = M_{x_{MBf}} + 1.5 \frac{\partial Mx}{\partial \theta} |\theta|_{act} \quad (8)$$

It should be appreciated that $|\theta|_{act}$ (used in equations 3 and 8) is the actual current cyclic pitch amplitude, whereas the value |θ| used in the equations to be presented subsequently is the future max cyclic pitch amplitude which must be determined. It should be understood that the estimate of the raw loads may be computed as part of a rotor load control algorithm.

At a step S11, a future maximum cyclic pitch amplitude |θ| is selected. As will be discussed further below, the step S11 may be performed a number of times, in order to evaluate the impact of multiple different pitch amplitudes on the ration R. At a step S12, a blade bearing load which would be experienced at the blade bearings in the case that the maximum cyclic pitch amplitude were to be adjusted to the value |θ| is calculated based on the BEM model.

At a step S13, an estimated wear rate on the blade bearings at the selected future maximum cyclic pitch amplitude |θ| is determined, using the current rotor speed Ω, the load Mx on the blade bearings and the Wöhler coefficient k2. In other words, the parameters collected at the steps S2 and S3 are again used in the estimate of future blade bearing wear based on the selected cyclic pitch amplitude |θ|. It should be noted that the value $$\frac{\partial Mx}{\partial \theta}$$

does not change based on individual pitch amplitude and therefore does not need to be recomputed each time. The future blade wear is calculated at the step S13 in the same way and using the same equation (3) as for the step S4, but using the selected future maximum cyclic pitch amplitude |θ| instead of the actual current maximum cyclic pitch amplitude |θ|act. In particular, the future blade wear is calculated as follows:

$$\frac{dLRD_{PB}}{dt} \approx \left(\frac{2|\theta|act\,\Omega}{360} Mx\right)^{k2} \quad (9)$$

At a step S14, the blade flap sensitivity $$\frac{\partial Mx}{\partial \theta}$$

at the selected maximum cyclic pitch amplitude |θ| is obtained from the blade element model 144. Then, at a step S15, the blade flap sensitivity $$\frac{\partial Mx}{\partial \theta}$$

is used, along with the selected cyclic pitch amplitude |θ| to estimate a load on the main bearing at the selected cyclic pitch amplitude |θ|.

In particular, an approximation of the main bearing wear dependent on the cyclic pitch angle is calculated in accordance with the following expression:

$$Mx_{Mbf} \approx Mx_{Mbf,raw} - 1.5 \frac{\partial Mx}{\partial \theta} |\theta| \quad (10)$$

It will be appreciated that the steps S9 and S10 effectively determine a main bearing loading $Mx_{Mbf}$ without blade pitch contribution (by removing the blade pitch contribution at the actual cyclic pitch amplitude |θ|act), and then the steps S14 and S15 effectively reintroduce the blade pitch contribution, but at the selected (future) cyclic pitch amplitude |θ|.

At a step S16, the wear rate on the main bearing at the selected cyclic pitch amplitude |θ| is estimated using equation (4), based on the main bearing loading $Mx_{Mbf}$ calculated at the step S15, the current rotor speed Ω and the Wohler coefficient k1. It will be appreciated that while equation (4) is used both at the step S6 and S16, in the former case the equation is based on the measured main bearing loading $Mx_{Mbf}$, while in the latter case it is based on an estimated future loading $Mx_{Mbf}$ at the selected blade pitch. At a step S17, the estimates for main bearing wear rate and blade bearing wear rate at the selected (future) cyclic pitch amplitude |θ|, along with the lifetime design wear capacities for the main bearing and the blade bearings (the lifetime design wear capacities being the same values as used at the step S7), are used to calculate a wear ratio between the main bearing and the blade bearings at the selected cyclic pitch amplitude. This calculation uses the equation (7) utilised in the step S7.

This (future) wear ratio is an indication of the probable future balance between wear on the main bearing and wear on the blade bearings should the blade pitch be modified in accordance with the selected cyclic pitch amplitude |θ|.

The steps S11 through S17 (those steps within the dashed region of FIG. 3) are repeated for several different maximum cyclic pitch amplitudes, in order to obtain the corresponding wear ratios. At a step S18, each of the predicted wear ratios is compared with a desired wear ratio for the turbine, and the maximum pitch amplitude corresponding to the predicted wear ratio closest to the desired wear ratio is selected. The maximum pitch amplitude selected at the step S18 is then used by the pitch controller 100 in setting the pitch of the turbine blades 18.

Alternative techniques could be used, such as optimisation using a Newton-Raphson method, as described in Erwin Kreyzig, Advanced Engineering Mathematics, 9th Edition, Wiley International Edition, ISBN-13:978-0-471-72897, Chapter 19. In this case the Newton-Raphson method also iterates over the equations a number of times.

To summarise, the present technique provides a real time estimate of the current wear on the pitch and main bearing coupled with an estimate of how much main bearing wear reduction and pitch bearing wear will be introduced from specific individual pitch amplitudes.

With this information it is possible to devise a rotor lift strategy which balances the wear on the bearings according to how effective rotor lift is at the current operating point (that is, wind and rotor speeds). Larger individual pitch amplitudes (higher pitch bearing wear) is required at low wind speeds to create the same rotor lift as in higher wind speeds. The instantaneous wear rate on the bearings can be computed as shown in equations (5) and (6) above, while equation (10) above relates main bearing loads (and wear) to pitch amplitude.

The following inputs are required for these equations:
Main bearing tilt load: Computed from blade loads sensors as is already done in TYC
Raw main bearing tilt load: Main bearing tilt load without rotor lift contribution. This is computed using the tilt sensitivities computed by a BEM model
Blade flap moment: From blade load sensors and/or using the blade flap moment estimate computed by BEM.
Rotor speed: Generator or Rotor speed sensor.

By defining the wear ratio between the main and pitch bearings as per equation (10) and inserting the above three equations it is possible to compute the rotor lift pitch amplitude realizing this wear ratio. The result is a bearing wear controller which balances the pitch and main bearing wear such that the lifetime of the bearings is controllable regardless of site wind distribution. It should be understood that the desired wear ratio may not always be a value of 1 (which would result in or from the wear rate on the main bearing being the same (as a proportion of its lifetime wear capacity) as that of the blade bearings). Some circumstances in which a different wear ratio may be used are described below.

The present technique may be entirely software-based, with no hardware modifications to the turbine being required, and can accordingly be retrofitted to existing turbines already in operation. Advantageously, the present technique can be used to increase the predictability of turbine maintenance.

Park Specific Tuning

As part of siting wind turbines, a maintenance strategy is prepared, which includes planning for replacement of main and/or pitch bearings. With the bearing wear controller 100 described above, it is possible to make tradeoffs for specific sites where wind conditions do not allow both main and pitch bearings to last the full lifetime of the turbine with the standard configuration. An example is a low shear/low turbulence site. This will usually yield high main bearing wear, but low blade bearing wear. It is now possible to adjust the ratio, R, towards lower blade bearing loads sacrificing some of the pitch bearing margin which is available due to low turbulence. In another example a site has high turbulence and low shear and in the standard configuration both blade bearing and main bearing will need to be replaced during the turbine life-time. It is now possible to, for example, bias the ratio, R, towards reducing wear on the main bearing such that the main bearing will last the full life of the turbine, but with one planned replacement of blade bearings. In other words, the wear ratio can be set in dependence on the environmental conditions in which the wind turbine is operating to achieve desired lifetimes (either relative or absolute) for each of the main bearing and the blade bearings.

Predictive Maintenance

By accumulating the wear estimates computed by the wear controller at the steps S4 and S6 described above, a wear profile per turbine can be made. This wear profile, effectively indicating the actual wear on each of the bearings experienced to date, can be used to extrapolate the lifetime of the bearings and subsequently plan inspection/servicing schemes for each specific turbine. In this way, if the turbine experiences greater than expected wear on either or both of the main bearing and the blade bearings, inspection and/or servicing of that turbine may be carried out earlier than planned. A further extension is to adjust the bearing lifetime design estimates by correlating blade failures with the estimated blade wear and use this to modify maintenance schedules for other similar turbines. In this case, if over time the data gathered shows that the blade wear limit before breaking is less than expected, then the ratio R can be adjusted on other turbines with the same blade bearings to reduce blade bearing load such that the blade bearings will last the expected time at the expense of main bearing wear.

Bearing Lifetime Management

By permitting the bearing wear ratio, R, to be controlled externally of the turbine, a bearing lifetime management system can be created. The bearing lifetime management system will use the accumulated wear estimates to extrapolate bearing wear and adjust the wear ratio, R, in order to, for example:
Avoid overloading one of the bearings
Ensure that all bearings can be replaced simultaneously (avoiding dual crane cost)
Increasing the total lifetime of the turbine with no need for bearing exchange.

Figure 4:
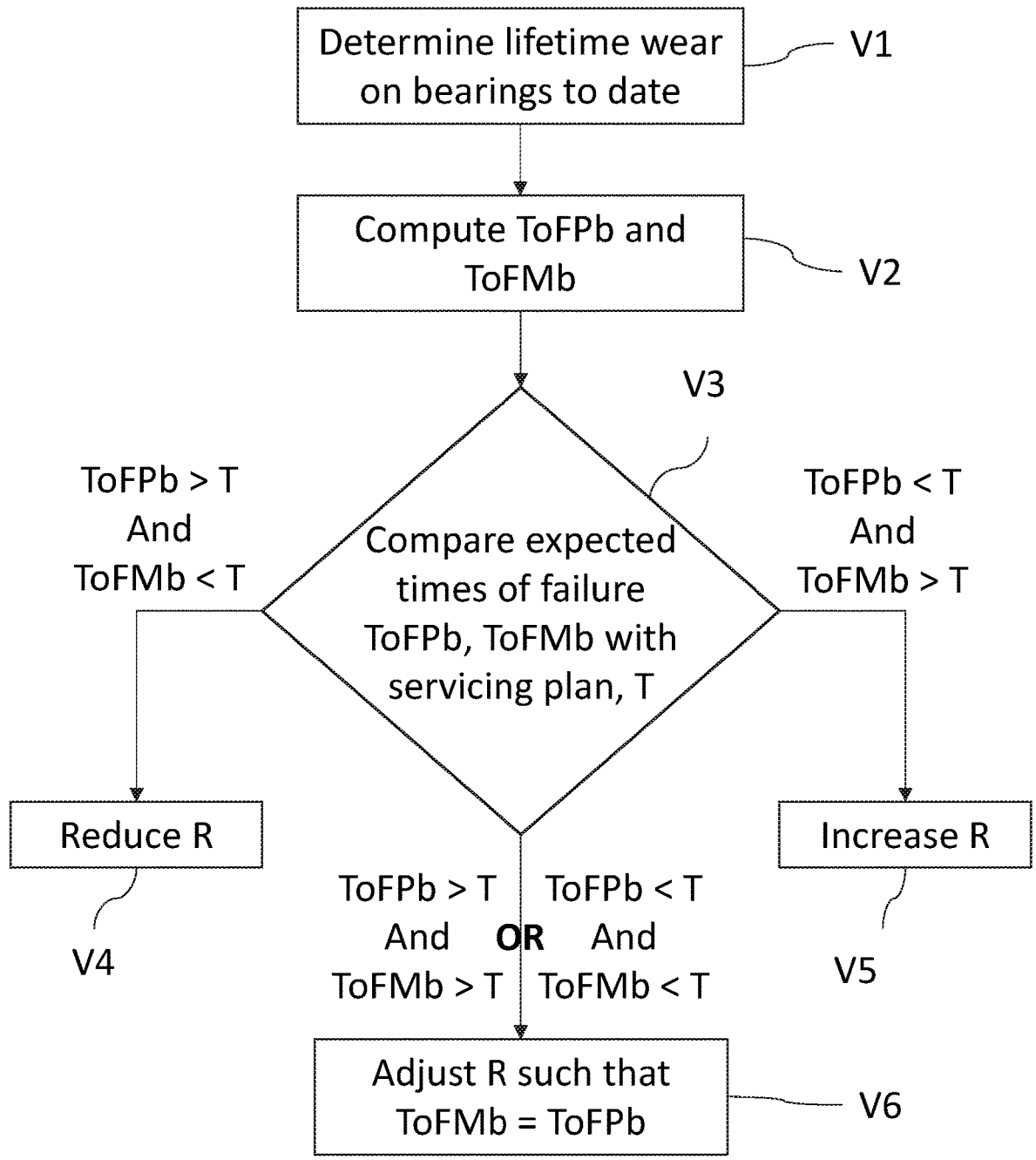
FIG. 4 is a schematic flow diagram describing a bearing lifetime management process.

Referring to FIG. 4, an example bearing lifetime management algorithm is shown. At a step V1, the lifetime wear of the main bearing and pitch bearing up until now is determined by integrating the computed wear rates at the step S4 and S6 of FIG. 3. An expected time of failure ToFPb of the blade bearings and an expected time of failure ToFMb of the main bearings are computed at a step V2 based on the lifetime wear to date, and the lifetime design wear capacities for the main bearing and blade bearings. At a step V3, the expected time of failure for each of the main bearing and the blade bearings are compared with a servicing plan for the turbine. If the time of blade bearing failure is later than the time of planned replacement and the time of main bearing failure is earlier than the time of planned replacement (that is, ToFPb>T, ToFMb<T), then at a step V4 the ratio R is reduced. If the time of blade bearing failure is earlier than the time of planned replacement and the time of main bearing failure is later than the time of planned replacement (that is, ToFPb<T, ToFMb<T), then at a step V5 the ratio R is increased. If the time of blade bearing failure is later than the time of planned replacement and the time of main bearing failure is later than the time of planned replacement (that is, ToFPb>T, ToFMb>T), or if the time of blade bearing failure is earlier than the time of planned replacement and the time of main bearing failure is earlier than the time of planned replacement (that is, ToFPb<T, ToFMb<T), then at a step V6 the ratio R is adjusted such that the time of failure of the main bearing and the blade bearings is the same, that is ToFMb=ToFPb.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of controlling a wind turbine, comprising:
    calculating a current wear rate for each of the main bearing of a turbine rotor and the blade bearings of rotor blades mounted on the turbine rotor;
    calculating a blade pitch adjustment of the rotor blades to achieve a desired ratio between main bearing wear and blade bearing wear in dependence on the calculated current wear rates of the main bearing and the blade bearings; and
    performing the blade pitch adjustment of the rotor blades based on the desired ratio.

2. A method according to claim 1, wherein the calculation of the blade pitch adjustment is dependent on an influence of blade pitch on each of main bearing wear and blade bearing wear.

3. A method according to claim 1, comprising:
    calculating a current wear ratio between wear on the main bearing and wear on the blade bearings in dependence on the calculated current wear rate of each of the main bearing and the blade bearings, a lifetime design wear capacity of the main bearing and a lifetime design wear capacity of the blade bearings; and
    calculating an adjustment of the blade pitch which will shift the current wear ratio to match the desired wear ratio.

4. A method according to claim 1, wherein the current wear rate of the main bearing is calculated in dependence on a current load on the main bearing.

5. A method according to claim 4, comprising measuring a load on the main bearing, wherein the current load on the main bearing is based on the measured load on the main bearing.

6. A method according to claim 4, wherein the current wear rate of the main bearing is calculated in dependence on current rotor speed.

7. A method according to claim 1, comprising calculating an influence of current blade pitch on the load on the main bearing.

8. A method according to claim 7, wherein the influence of current blade pitch on the load on the main bearing is dependent on a blade flap load sensitivity to pitching obtained from a computerised model.

9. A method according to claim 7, comprising calculating a raw main bearing load without blade pitch influence using the calculated influence of current blade pitch.

10. A method according to claim 9, comprising calculating, in relation to a candidate blade pitch, an estimated main bearing load using that candidate blade pitch.

11. A method according to claim 10, comprising estimating an influence of the candidate blade pitch on the load on the main bearing, and estimating the main bearing load based on the raw main bearing load and the estimated influence of the candidate blade pitch.

12. A method according to claim 1, wherein the current wear rate of the blade bearings is calculated in dependence on a current load on the main bearing.

13. A method according to claim 12, comprising measuring a load on the blade bearings, wherein the current load on the blade bearings is based on the measured load on the blade bearings.

14. A method according to claim 12, comprising estimating the current load on the blade bearings based on a computerised model.

15. A method according to claim 1, wherein the current wear rate of the blade bearings is calculated in dependence on current rotor speed.

16. A method according to claim 1, wherein the blade pitch adjustment is a modification to a cyclic pitch amplitude of the rotor blades.

17. A method according to claim 1, comprising setting a desired wear ratio in dependence on one or both of an amount of shear and an amount of turbulence expected at the location of the wind turbine.

18. A method according to claim 17, wherein the desired wear ratio is set such that the main bearing and the blade bearings will require replacement at approximately the same time.

19. A method according to claim 17, wherein the desired wear ratio is set such that one of the main bearing and the blade bearings will require replacement after a duration which is a multiple of the other of the main bearing and the blade bearings.

20. A method according to claim 1, comprising accumulating the current wear rates over time, automatically extrapolating a lifetime for the main bearing and/or the blade bearings.

21. A method according to claim 20, comprising adjusting the desired wear ratio to reduce the likelihood of overloading one of the bearings or permitting simultaneous replacement of the main bearing and blade bearings or increasing the total lifetime of the turbine without replacing the bearings.

22. A wind turbine comprising:
    a turbine rotor mounted on a main bearing;
    a set of rotor blades mounted on the turbine rotor using blade bearings; and
    a controller operable to:
    calculate a current wear rate for each of the main bearing and the blade bearings;
    calculate a blade pitch adjustment of the rotor blades to achieve a desired ratio between main bearing wear and blade bearing wear in dependence on the calculated current wear rates of the main bearing and the blade bearings; and
    perform the blade pitch adjustment of the rotor blades based on the desired ratio.

23. A non-transitory computer-readable medium carrying a computer program which when executed on a data processing apparatus will cause the data processing apparatus to control a wind turbine to perform an operation, comprising:
    calculating a current wear rate for each of the main bearing of a turbine rotor and the blade bearings of rotor blades mounted on the turbine rotor;
    calculating a blade pitch adjustment of the rotor blades to achieve a desired ratio between main bearing wear and blade bearing wear in dependence on the calculated current wear rates of the main bearing and the blade bearings; and performing the blade pitch adjustment of the rotor blades based on the desired ratio.

\* \* \* \* \*